United States Patent [19]

Foley

[11] 3,909,967

[45] Oct. 7, 1975

[54] TELEPHONE INDEX DEVICES

[76] Inventor: James P. Foley, Crest Road, Katonah, N.Y. 10536

[22] Filed: Mar. 12, 1974

[21] Appl. No.: 450,476

Related U.S. Application Data

[60] Division of Ser. No. 233,480, March 10, 1972, which is a continuation-in-part of Ser. No. 116,384, Feb. 18, 1971, which is a continuation-in-part of Ser. No. 8,660, Feb. 4, 1970, abandoned, which is a continuation-in-part of Ser. No. 837,405, June 30, 1969.

[52] U.S. Cl. .................................. 40/336; 40/339 X

[51] Int. Cl.[2] .............................................. G09F 3/00

[58] Field of Search ......... 40/336, 10; 248/291, 314; 281/15 B

[56] References Cited

UNITED STATES PATENTS

| | | | |
|---|---|---|---|
| 862,242 | 8/1907 | Endean | 40/339 X |
| 879,082 | 2/1908 | Cave | 40/339 X |
| 967,438 | 8/1910 | Richardson | 40/339 X |
| 2,553,853 | 5/1951 | Fisher | 40/336 |

*Primary Examiner*—Robert W. Michell
*Assistant Examiner*—Wenceslao J. Contreras
*Attorney, Agent, or Firm*—Spellman & Joel

[57] ABSTRACT

Telephone index devices including a flat base member which may be secured to a telephone and having binding loops which may be closed and opened for replacement of index sheets. The base member is secured to a telephone instrument by a plug and socket structure.

2 Claims, 15 Drawing Figures

TELEPHONE INDEX DEVICES

This is a division of application Ser. No. 233,480 filed Mar. 10, 1972 which is a continuation-in-part of my co-pending application Ser. No. 116,384, filed Feb. 18, 1971, which is a continuation-in-part of application Ser. No. 8,660, filed Feb. 4, 1970 and now abandoned, which in turn is a continuation-in-part of a co-pending application Ser. No. 837,405, filed June 30, 1969.

This invention relates to index devices, and more particularly, it concerns novel arrangements for mounting an index device on a telephone instrument for holding the index leaves thereof in place for convenient accessability and use.

Various provisions are made in the arrangements of the previously filed applications for inserting leaves into the loops. In one case, the leaves are inserted during manufacture while the loops are opened, and the loops are then subjected to machine action which closes them and secures them permanently. In another case, the base member on which the loops are mounted, is made up of two flat portions which are resiliently hinged together along a line passing between the legs of each loop. One leg of each loop is permanently secured along one of the base member portions while the other leg extends down to the other base member portion without, however, being secured to it. Sheets or leaves are inserted by first bending down one of the base member portions along the hinge to expose the free ends of the loops. The sheets are passed onto the loops and the base member portions are returned to coplanar condition to close the free ends of the loops.

Said application Ser. No. 116,384 also discloses loop closing devices disclosed herein as well as an embodiment in which the hinge is eliminated and the two base member portions are provided with mutually engageable recesses and projections which prevent relative movement in their common plane. Means are further provided to prevent relative movement out of their plane.

The present invention relates to loop opening and closing arrangements which may be easily operated and which are positive in their manner of holding the binding loops closed. These loop opening and closing arrangements comprise a strip member which extends along a side of the base or support member on which the sheets are supported. U-shaped binding loops, which are struct from or are molded with the base member, or the strip member, have one leg attached to the edge of either the base or to the strip member while the other leg of the loop extends to the other member. The strip member and the base member are provided with holding formations such as tongues and sockets which permit the strip member to be moved in coplanar relationship with the base member and held against its edge to close the binding loops. The holding formations, in one form of the invention, include a pivot coupling between the base member and one of the strip member which enables the strip member to swing in the plane of the base member against and out away from its edge.

According to a still further aspect of the invention provision is made for mounting a telephone index assembly on the side of a telephone in a way permitting it to be positionally adjusted or even removed for replacement or remote reference. This provision includes a bracket member which may be affixed to a telephone which has, alternatively, a socket or a plug, and a flat base member for supporting telephone index sheets which has a cooperating plug or a socket secured to the underside thereof. The plug fits frictionally into the socket and allows the base member to be pivoted or removed.

One object of the invention is to provide a telephone index device mounting structure which may be used to mount the device on telephone instruments of different types, which permits the index device to be rotated to different positions when it is so mounted and which permits ready removal thereof.

Another object of the invention is to provide a telephone index device with readily replaceable index pages and holding means therefor which holds the pages securely but which can be deliberately opened easily.

Various further and more specific objects features and advantages of the invention will appear from the description given below, taken in connection with the accompanying drawings, illustrating by way of example preferred forms of the invention.

FIG. 1 is an enlarged section of the embodiment in FIG. 12 and is taken along line 13—13 indicated therein;

Figures 1, 2, 3, 4, 5, 6:
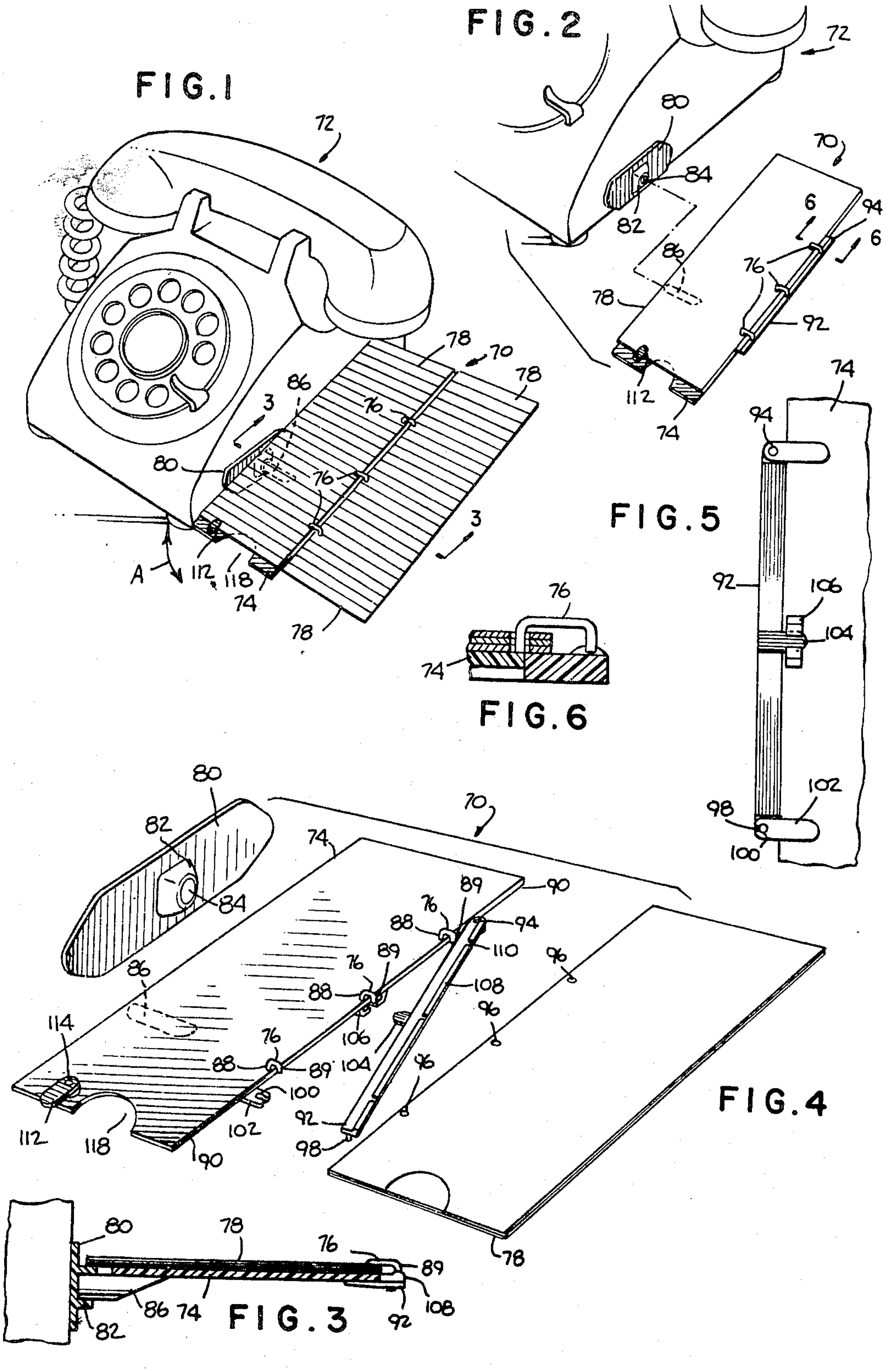
FIG. 1 is a perspective view of a telephone index device, constituting a further embodiment of the invention, attached to the side of a telephone instrument.
FIG. 2 is a view similar to FIG. 1 but illustrating the index device as removed from the telephone instrument.
FIG. 3 is an enlarged section view taken along line 9—9 of FIG. 1.
FIG. 4 is an enlarged, exploded, perspective view of the telephone index device of FIG. 1.
FIG. 5 is a fragmentary bottom view of the index device of FIG. 1.
FIG. 6 is an enlarged section view taken along line 12—12 of FIG. 2.

Although index devices which fit under and secure to the base of a telephone instrument are still satisfactory for use with both many new and older telephone instruments in use, e.g. the instrument shown in FIG. 1, newer types of instruments, such as wall mounted or elongated instruments, have shapes which prevent the use of an index device which has dimensions suitable for use under the instrument shown in FIG. 1. Accordingly, it is desirable to provide a single telephone index device which can be readily secured or attached to almost all types of instruments. In addition, it is desirable to be able to vary the position of the index device when it is so mounted and to be able to remove it readily for use at a different location. Also, it should be possible to insert or remove index pages easily while maintaining them securely in place and permitting them to be flat when they have been inserted. The embodiment shown in the drawings and described hereinafter meets such requirements.

The telephone index devices shown in FIGS. 1–15 are not mounted underneath the telephone instrument with which they are used; but instead they are attached to the side of the telephone instrument. As shown in FIG. 1, a telephone index device 70 is attached, preferably by means of glue or double backed pressure adhesive tape, or alternatively by other means, to one side of the outer cover of a cradle type telephone instrument 72. The telephone index device 70 includes a flat, rectangularly shaped base member 74 having a plurality of binding loops 76 thereon which hold a stack of index sheets 78 in ring binder fashion. The base member 74 is supported by a mounting plate 80 which, in turn, is secured to the telephone 72 by means of an adhesive substance.

The preferred manner in which the base member 74 is supported by the mounting plate 80 is best shown in FIGS. 2 and 3. As can be seen therein, the mounting plate 80 is provided with a boss 82 extending a short distance out from the central portion thereof. The boss 82 has an opening 84 therein which accommodates a cylindrical mounting plug 86, the plug 86 having, for example, a push fit therewith. The mounting plug 86, which is attached to the underside of the base member 74, is frictionally gripped by the wall of the opening 84 so as to retain the base 74 in the position shown in FIG. 1. It can, however, pivot within the opening 84 to adjust the position of the index device as indicated by the arrow A in FIG. 1. If desired, the mounting plug 86 may be pulled from the mounting plate 80 as illustrated in FIG. 2. This allows removal of the entire telephone index assembly from the telephone for any desired purpose, e.g. to add or remove index sheets, to refer to the information printed on the sheet at a different location or to add new information to the sheets.

It will be apparent from the foregoing that such mounting of the base 74 permits the use of the telephone index device with telephone instruments of many different shapes, since the mounting device requires only a small area on the instrument to attach the plate 80 and room alongside the instrument to receive the base 74 which usually is shorter than the length of the instrument. Therefore, it is unnecessary to manufacture index devices in several sizes and shapes to permit them to be used with differently shaped or mounted instruments.

Although the base and the arrangements for holding the index pages may be as shown in FIGS. 17–21 of my said application Ser. No. 116,384, the preferred construction of the base member 74 is best shown in the exploded view of FIG. 4. As can be seen, the base member 74, which is preferably made of a plastic substance, such as polystyrene or polypropylene, is of rectangular slab-like configuration. The binding loops 76 are of inverted U-shaped configuration and are positioned so that one leg 88 of each loop extends up from one edge 90 of the base member. The other leg 89 of each of the U-shaped binding loops 76 extends downwardly and is spaced away from the edge 90 of the base member. A loop closure strip member 82 is pivotally secured at one end 94 to the edge 90 of the base member 74. The loop closure strip 92 moves pivotally in the plane of the base member 74 from an open position as shown in FIG. 4 to a closed position as shown in FIGS. 5 and 6. In the closed position, the edge of the loop closure strip 92 abuts the edge 90 of the base member 74 and effectively closes the bottom of each of the binding loops 76. When the closure strip 92 is pivoted to an open position as shown in FIG. 4, the bottoms of the binding loops 76 are opened to accept the various index sheets 78. As can be seen in FIG. 4 the index sheets 78 are provided with binding loop openings 96 near one edge. To load the index sheets onto the device, the sheets are fitted to the exposed outer legs of the binding loop 76 by passing the legs through the openings 96. Thereafter the binding loops are closed to secure the sheets in place by moving the loop closure strip to its loop closing position against the edge of the base member 74.

The end of the closure strip 92 opposite the pivot 96 is provided with a downwardly extending locking lug 98 shown in FIGS. 4 and 5. This locking lug fits into a locking lug opening 100 in a locking tab 102 which projects out from under the edge 90 of the base member 74. The opening 100 and the locking lug 98 are dimensioned and configured to provide a snap fit to hold the loop closure strip 92 securely yet releasably in its loop closure position shown in FIGS. 5 and 6.

Preferably, the loop closure strip 92 is additionally provided with a guide tab or tongue 104 which extends inwardly from its lower surface toward and under the base member 74. The guide tab 104 is accommodated in a guide tab socket 106 formed on the underside of the base member 74. The guide tab 104 and the guide tab socket 106 serve to maintain the loop closure strip 92 firmly in coplanar relationship with the base member 74 when the closure strip is locked in its loop closure position shown in FIGS. 5 and 6.

The loop closure strip 92 is additionally provided with a slightly raised outer edge bead 108 which is interrupted at positions corresponding to the edge 89, such as shown in FIG. 5 to accommodate the outer ends of each of the binding loops 76. The portions of the bead 108 may have the length shown to reinforce the strip 92, but if desired, the intermediate positions thereof may be omitted leaving only the end portions thereof, i.e. small projections like those in FIG. 12 extending from the strip 92 on opposite sides of the legs 89. This configuration, as can be seen in FIG. 6, serves to insure that the binding loops are fully closed by the loop closure strip 92 so that the index sheets 78 cannot be removed when the closure strip is in its closed position. Such bead 108 also prevents excessive bending of the loops around the axis of the leg 88.

The base member 74, the binding loops 76 and the loop closure strip 92 may be made of any suitable materials; however, it is presently preferred to make them of molded plastic such as polystyrene or polypropylene. Where polypropylene is used it is possible to manufacture the entire base member 74 including the pivotal connection 94, the binding loops 76 and the loop closure strip 92 in a single molding operation. This, of course, eliminates assembly and fastening procedures and considerably reduces the cost of manufacture of the device. As can be seen in FIGS. 1, 2 and 4, there may be provided a page holding tab 112 along the bottom edge of the base member 74 near the edge opposite the binding loop edge 90. As can be seen in FIG. 1, this page holding tab 112 may be pivoted around its pivot 114 to engage the lower edge of the sheets which lie on the base member 74. This protects against any tendency which the sheets may have to curl after extended usage. The tab 108 is mounted on a pivot 114 along with the spacer 116 between the tab and the base member so that the tab pivots in the plane of the base member 74 a short distance above its surface.

The base member is additionally provided with a thumb cut-out 118 along its lower edge adjacent the page holding tab 112. This thumb cut-out permits insertion of the thumb to engage and turn any or all of the index sheets 78 as may be desired.

Figures 7, 8, 9, 10:
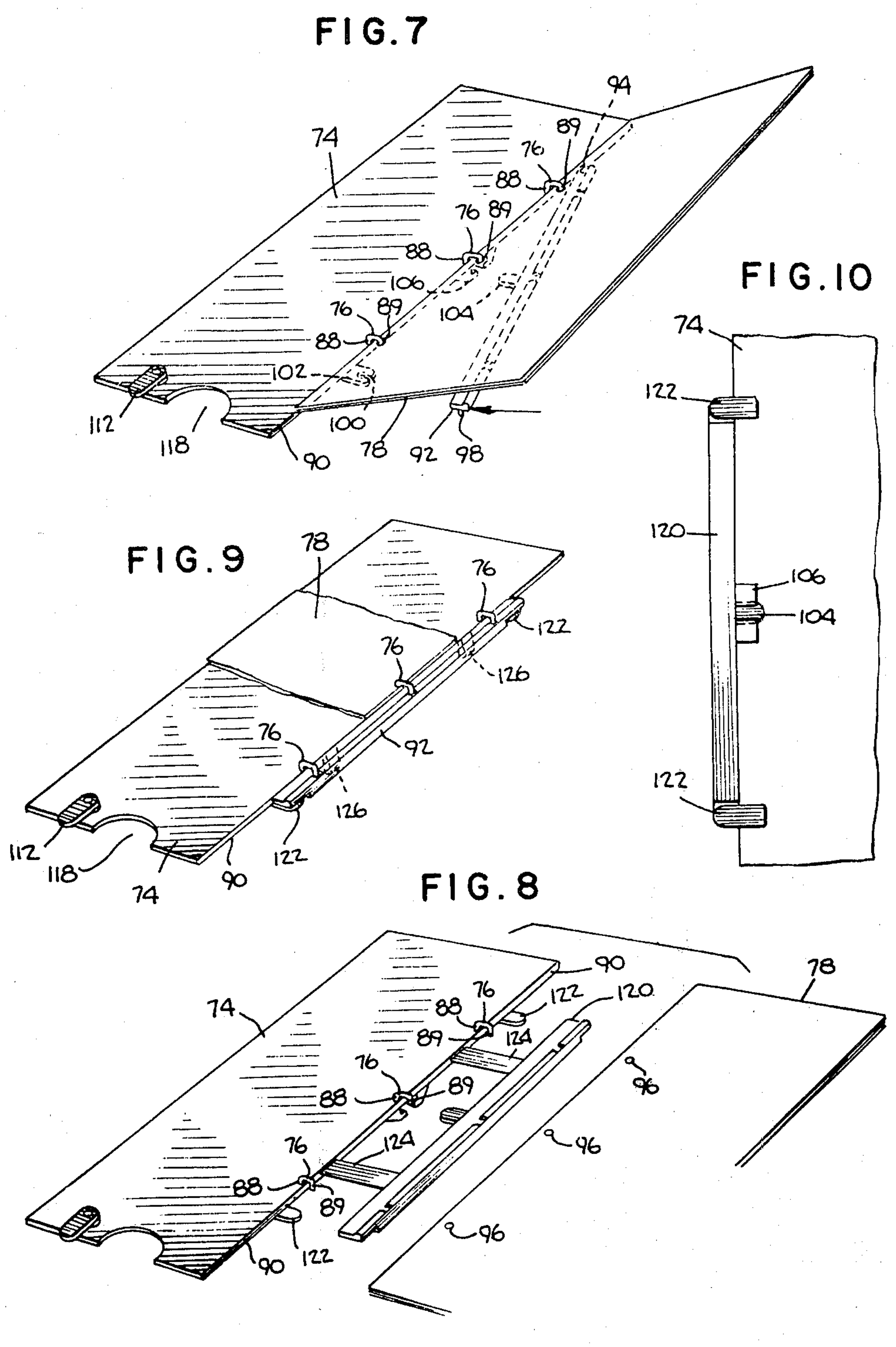
FIG. 7 is a perspective view illustrating the manner of operation of the telephone index device of FIG. 1.
FIG. 8 is a perspective view of a modification to the telephone index device of FIG. 1.
FIG. 9 is a view similar to FIG. 8 but showing the telephone index device in its binding loop closing position.
FIG. 10 is a fragmentary bottom view of the telephone index device shown in FIG. 9.

The embodiment of FIGS. 8-10 differs from that of FIGS. 1-8 in that in place of the pivotally mounted loop closure strip 92 there is provided a laterally removable loop closure strip 120. As can be seen in FIGS. 8 and 10, a pair of closure strip support tabs or tongues 122 extend outwardly from under the edge 90 of the base member 74 on opposite sides of the guide tab socket 106. The support tongues 122 accommodate the ends of the closure strip 120 and they cooperate with the closure strip, its guide tab 104 and the guide tab socket 106 to hold the closure strip 120 in loop closing position as shown in FIGS. 9 and 10. It will be appreciated that when the loop closure strip is moved out and away from the base member 74 in coplanar relationship therewith the outer ends of the binding loops 76 are completely exposed for accommodation of the binding loop openings 96 in the index sheets 78. Moreover, the closure strip support tongues 122 permit the closure strip 120 to be moved laterally into loop closing position and yet support the closure strip securely in coplanar relationship with the base member to insure that the binding loops remain closed during use of the device and turning of the various index sheets 78. To aid in holding the strip 120 against the base 74, the socket 106 may be dimensioned so as to frictionally grip the tab 104 and the tongues 122 may have upper surfaces so related to the lower surface of the strip 120 that the strip 120 will be bent slightly transversely of its length as the ends of the strip 120 ride over the tongues 122. In addition, retention of the strip 120 in position may be assisted by loop engaging ridges thereon as described hereinafter in connection with FIGS. 11 and 14.

Where in the index device is manufactured of a high strength plastic material such as polypropylene, it is possible to manufacture the closure strip and base member in a single operation as a single unitary structure by providing in the mold arrangements whereby ribbon-like connectors 124 of the polypropylene or similar material extend between the loop closure strip 120 and the base member 74. These ribbon-like connectors may be approximately ¼ inch wide and about 0.010 inches thick. This allows the connectors 124 to hold the loop closure strip 120 to the base member 74 as shown in FIG. 8 and at the same time it allows the connectors to assume loop like configurations 126 as shown in FIG. 9 when the loop closure strip 120 is in its loop closing position.

Figures 11, 12, 13, 14, 15:
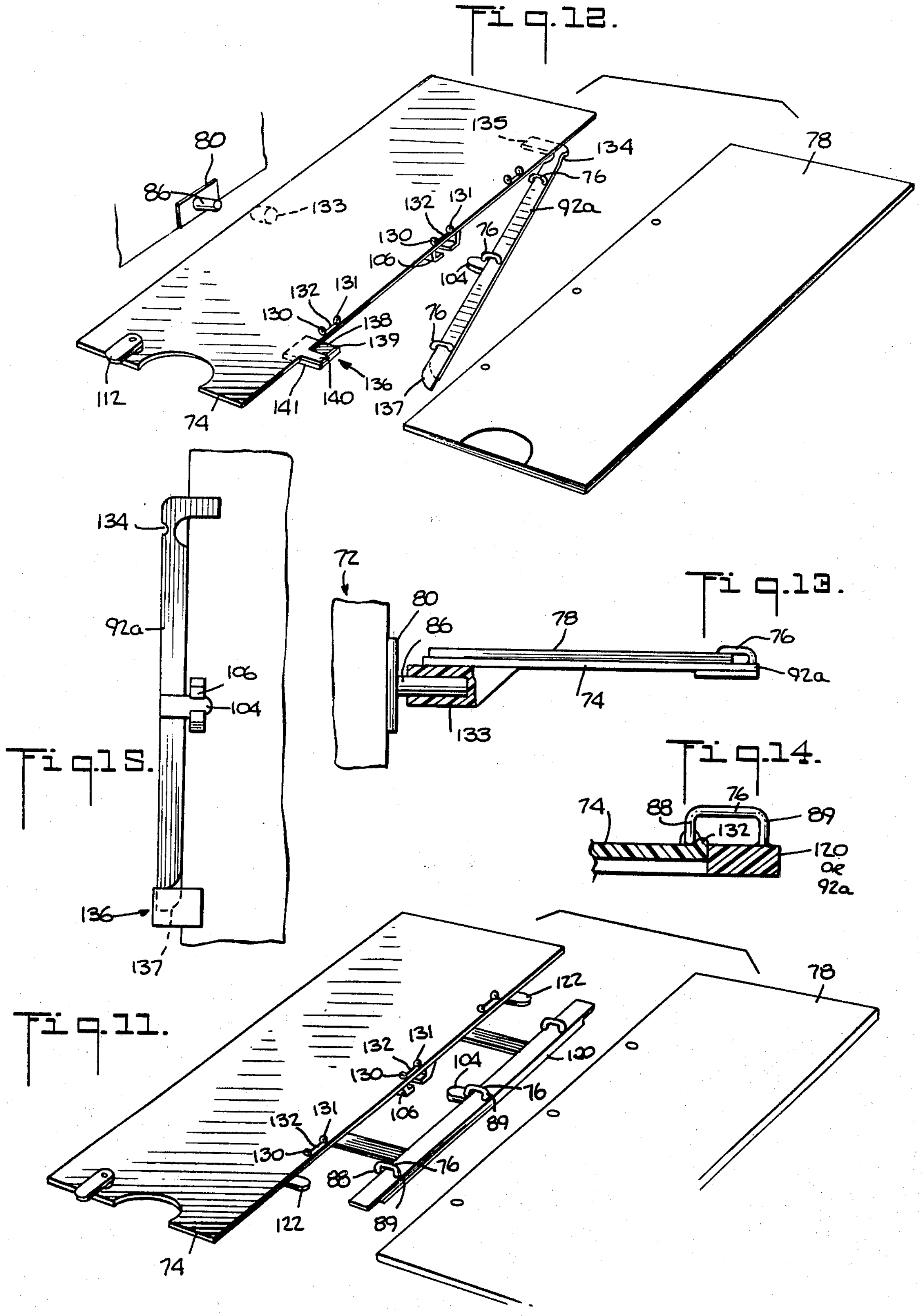
FIG. 11 is a perspective view of a modified form of the embodiment shown in FIGS. 8–10.
FIG. 12 is a perspective view of a modified form of the embodiment shown in FIGS. 1–7.
FIG. 14 is a fragmentary enlarged section of the loop portion of the embodiment in FIGS. 12 and 13.
FIG. 15 is a fragmentary bottom view of the embodiment in FIG. 12.

The U-shaped binding loops 76 may be formed as part of the closure strip 120, instead of part of the base 74, as indicated in FIG. 11. Thus, each of the binding loops 76 has its leg 89 formed as part of the closure strip 120 and the other leg 88 thereof is free and extends outwardly of a side edge of the strip 120. When the strip 120 is moved against the edge of the base 74 the legs 88 extend over the upper surface of the base 74 and are between pairs of projections 130 and 131 which serve to aid in closing the loops and to prevent excessive bending of the loops in the manner described in connection with FIGS. 4, 7, 8 and 9. Small ridges 132 may be provided intermediate the projections 130 and 131, which are of a height above the upper surface of the base 74 sufficient to cause the free end of the leg 88 to snap over the ridge 132 as the strip 120 is pushed against the edge of the base 74. The ridge construction is shown in greater detail in FIG. 14, and, as will be seen from FIG. 14, the width of the ridge 132 is such that the inner side of the leg 88 bears thereagainst when the strip 120 is against the edge of the base 74, thereby aiding in retaining the strip 120 against the base 74.

Similarly, the embodiment shown in FIGS. 1–6 may be modified to reverse the positions of the mounting plug and socket and of the binding loops 76. Thus, as shown in FIGS. 12 and 15, the plug 86 may be part of and extend from the mounting plate 80 rather than from the base 74, and the socket 133 may be secured to the base 74. The cooperation of the plug 86 and the socket 133 and their functions are the same as those described in connection with FIGS. 1–4. However, the mounting of the plug on the base 74 and the socket on the plate 80 as shown in FIGS. 1–4 is preferred, since it is preferred not to have a projection like the plug 86 extending from the telephone instrument when the base 74 is removed therefrom.

Similarly, the loops 76 may extend from the pivoted closure strip **92*a* rather than from the base 74 as shown in FIGS. 12 and 13, and such loops are of the dimensions and are mounted on the closure strip 92*a* in the manner described in connection with FIG. 11. The base 74 is similarly provided with projections 130 and 131 ridges 132 for the purposes described in connection with FIG. 11.**

The pivoted closure strip may also take the form shown in FIGS. 12 and 15 rather than the form shown in FIGS. 1–6. Thus, instead of pivotally mounting the closure strip on a pivot pin, the closure strip **92*a* may be molded integrally with the base 74 and be provided with a portion 134 having a reduced section which acts as a hinge for the strip 92*a*. Of course, instead of molding the strip 92*a* with the base 74, it may be molded as a separate piece and secured to the base 74 by an extension 135** thereof.

Also, instead of locking the closure strip to the base 74 by means of a locking lug 98 and a locking tab 102, the end of the strip **92*a* may be formed as shown in FIG. 12 so as to engage a supporting and locking tab 135 mounted to receive and hold the end of the strip 92*a*. Thus, as shown in FIGS. 12 and 15, the free end 137 of the strip 92*a* is stepped and rounded so that as it is pushed against the edge of the base 74 it is received in a portion 138 of the tab 136 and between the edge of the base 74 and a retaining ridge 139 on the tab 136. The tab 136 may be molded integrally with the base 76 or may be formed in two parts, the part 140 being molded integrally with the base 74, and the part 141, carrying the ridge 139, being a small plate secured to the lower surface of the base 74.**

It will be appreciated that there has been described a very compact and easily manufactured telephone index assembly which provides versatility and convenience in use and which lends itself to economical and simple manufacturing techniques.

Having thus described the invention with particular reference to the preferred forms thereof, it will be obvious to those skilled in the art to which the invention pertains, after understanding the invention, that various changes and modifications may be made therein without departing from the spirit and scope of the invention, as defined by the claims appended thereto. For example, the positions of certain parts may be interchanged. Thus, although not preferred, the closure strip may be at the edge of the base member opposite to that shown in the drawings. Also, the guide tabs and locking lug may be on the base member rather than the closure strip, and if a socket or tab cooperates therewith, it may be on the closure strip.

What is claimed as new and desired to be secured by Letters Patent is:

1. A telephone index device comprising:

a flat, slab-like base member for supporting a stack of index sheets on the upper surface thereof, mounting means for mounting said base member on a generally vertical surface of a telephone instrument comprising a mounting plate member, adhesive means for securing said mounting plate to said vertical surface of said telephone instrument, a cylindrical plug extending outwardly from one of said members, the axis of said plug being generally parallel to the plane of said base member, a corresponding cylindrical socket in the other of said members and adapted to receive and frictionally grip the extended portion of said plug to thereby maintain said base member in the desired position relative to said telephone instrument, said plug and said socket being dimensioned so as to provide a push fit permitting removal of said plug from said socket and adjustment of the plane of said base member at any desired angular position about the axis of said plug.

2. A device claimed in claim 2 wherein:

said members are made of plastic, said plug is formed integrally with said base member on the lower surface thereof, and, said socket is formed in a boss extending from said mounting plate member and formed integrally with said plate.

* * * * *